United States Patent [19]
Takagi et al.

[11] 3,867,824
[45] Feb. 25, 1975

[54] PIPE WORKING METHOD AND APPARATUS

[76] Inventors: Tatsuya Takagi, No. 6-10, Araebisumachi; Teruya Takagi, No. 6-4, Araebisumachi, both of Nishinomiya-shi, Hyogo-ken, Japan

[22] Filed: Sept. 27, 1973

[21] Appl. No.: 401,395

[30] Foreign Application Priority Data
Oct. 25, 1972 Japan.............................. 47-106192

[52] U.S. Cl......................... 72/118, 72/121, 72/125
[51] Int. Cl............................................ B21d 19/06
[58] Field of Search ....... 72/74, 112, 118, 119, 121, 72/125, 247, 84

[56] References Cited
UNITED STATES PATENTS
| | | | |
|---|---|---|---|
| 1,055,571 | 3/1913 | Tassey | 72/125 |
| 1,978,430 | 10/1934 | Kipnis | 72/119 |
| 2,337,362 | 12/1943 | Willinger | 72/121 |
| 2,345,871 | 4/1944 | Hallberg | 72/84 |
| 3,283,553 | 11/1966 | Taylor | 72/121 |

Primary Examiner—Lowell A. Larson
Attorney, Agent, or Firm—Stewart and Kolasch, Ltd.

[57] ABSTRACT

A method and device for working the end of a pipe to be joined to a pipe joint, which comprises rolling an annular groove on the outer surface of the pipe by the use of a rolling roll and, thereafter, bevelling the annular end of the pipe by means of a bevelling roll while the rolling roll is fitted in the groove previously rolled. A handy tool is also disclosed for use in working the method of the present invention.

5 Claims, 5 Drawing Figures

PATENTED FEB 25 1975 3,867,824

PIPE WORKING METHOD AND APPARATUS

FIELD OF THE INVENTION

The present invention relates to method and apparatus for rolling and bevelling the end portion of a pipe to be joined to the pipe joint disclosed in U.S. Pat. application Ser. No. 388,144, filed Aug. 14, 1973.

BACKGROUND OF THE PRIOR ART

In order to incorporate a pipe with the above mentioned pipe joint, the pipe must be provided with an annular groove formed at a position spaced at a predetermined distance from its end for achieving a locking engagement therebetween.

An O-ring that is mounted in the joint must be expanded and compressed between the outer surface of the pipe and the inside surface of the joint body for the sealing therebetween, when the pipe is axially inserted into the joint. Therefore, the pipe is also required to have an annular outer end bevelled for its ready insertion into the O-ring. The bevelled end surface should be well worked and finished by means of a cutting machine in order to prevent the O-ring from being damaged. If this is not done and the working of the beveled edges produces a rough surface, said surface will certainly cause damage to the O-ring which is made of a gum material. Machine cutting is not simple in itself and has many disadvantages, one of which is that a machine tool, such as a lathe, must be carried where the pipe is to be joined to the joint. Another disadvantage is that a bent pipe can not be worked with the machine tool.

SUMMARY OF THE INVENTION

An object of the present invention is to provide an improved pipe working method and device wherein the pipe can be provided at a position near its end with a cold-rolled annular groove which is exact in size and, in addition, the end of the pipe can also be beveled to a mirror-like surface without requiring the use of a machine tool or machine cutting.

Another object of the present invention is to provide a handy portable tool for working the pipe end portion in accordance with the above mentioned method.

Still another object of the invention is to provide a handy portable tool capable of working a bent pipe as well as a straight pipe.

Other objects and further scope of applicability of the present invention will become apparent from the detailed description given hereinafter; it should be understood, however, that the detailed description and the specific examples, while indicating preferred embodiments of the invention, are given by way of illustration only, since various changes and modifications within the spirit and scope of the invention will become apparent to those skilled in the art from this detailed description.

Pursuant to the present invention, the method for working the end portion of a pipe to be coupled with the pipe joint comprises the steps of, in turn, confronting the pipe at a predetermined position near its end with an axially restrained groove-rolling roll and at its end with an axially shiftable end-bevelling roll disposed coaxially with respect to the groove-rolling roll, pressing the groove-rolling roll against the pipe during the relative rotation thereof so as to cold-roll an annular groove on the outside surface of the pipe, shifting the end-bevelling roll to cause the same to move the end of the pipe, and pressing the end-bevelling roll against the end of the pipe during the relative rotation thereof so as to cold-bevel the end of the pipe while the groove-rolling roll is fitted in the groove just rolled. The step of pressing is preferably repeated several times so that the groove will be accurately finished in size.

The inventive method, in which, after an annular groove has been formed on the outer surface of the pipe with an axially restrained groove-rolling roll, the pipe-end is bevelled with an axially shiftable end-bevelling roll while the groove-rolling roll is fitted in the groove previously rolled, produces the following advantageous results: the working operation is much simpler in operation; the rolled groove is accurate in size; and the bevelled end has a smooth mirror-like surface.

The tool of the present invention which is particularly effective in working the method described above comprises a body, an axially restrained groove-rolling roll rotatably mounted on the body, an axially shiftable end-bevelling roll rotatably mounted on and disposed coaxially with the groove-rolling roll, at least a pair of receiving rolls rotatably mounted on the body and disposed parallel to the groove-rolling roll, adjusting means mounted on the body for adjusting a space defined by said rolls, and shifting means mounted on the body for selectively positioning the end-bevelling roll relative to the groove-rolling roll. The pipe to be worked is inserted axially into the space between said rolls, and by rotating said tool an annular groove is rolled on the pipe surface and an annular bevelled surface is provided at its end.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
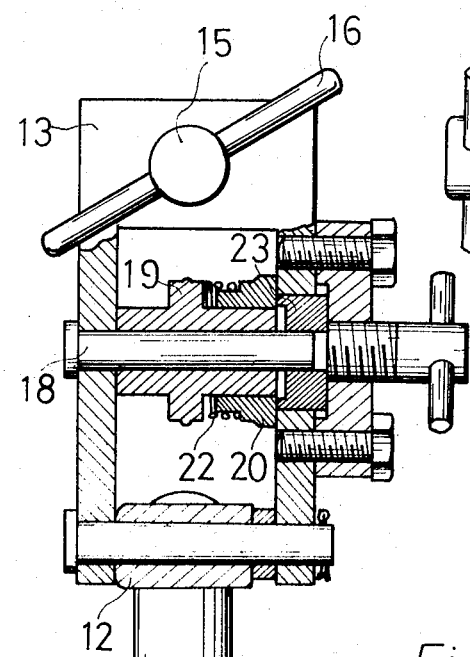
FIG. 1 is a side elevation, partly in section passing through the axis of the groove-rolling roll, of the inventive tool.
Figure 2:
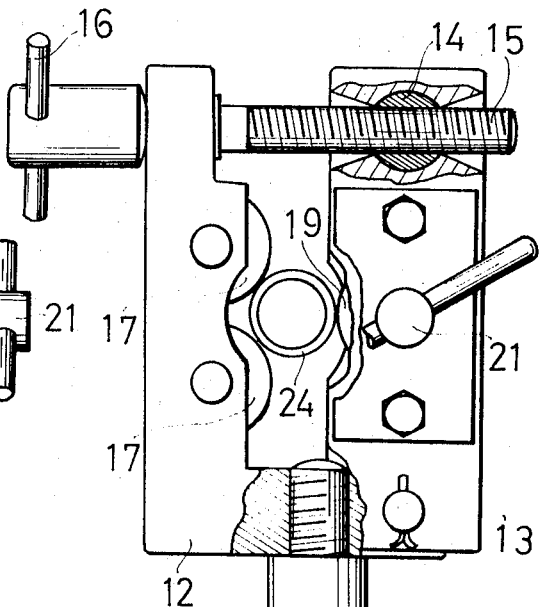
FIG. 2 is a front elevation partially in longitudinal cross section of the tool shown in FIG. 1.

Referring to FIGS. 1 and 2, the inventive tool includes a hand grip 11, a frame 12 fixed to the top of the grip, and a rotatable frame 13 pinned to the foot of the frame 12. A cylindrical nut 14 with a threaded through bore therein is rotatably incorporated in the top portion of the rotatable frame 13. A screw shaft 15 is inserted through a bore provided in the top portion of the frame 12 and threaded in the cylindrical nut 14 at the top portion of the rotatable frame 13, so that, upon rotation of a handle 16 attached to the head of the screw shaft 15, the distance between both top portions of said frames or the space defined by both frames can be adjusted.

A pair of receiving rolls 17 are rotatably mounted on the frame 12 and spaced axially and radially a predetermined distance from each other.

A working axis 18 is mounted on the middle portion of the rotatable frame 13 and disposed parallel to the receiving rolls 17. An axially restrained groove-rolling roll 19 and an axially shiftable end-bevelling roll 20 are alined coaxially with the axis 18. The axis 18 has its front end journalled in a bushing 23 and its rear end fixedly supported by the rear wall of the rotatable frame 13, the bushing 23 being slidably mounted in the front wall of the rotatable frame 13. The end-bevelling roll 20 is movable along and on the cylindrical portion of the groove-rolling roll 19. A screw handle 21 is mounted in the front wall of the rotatable frame 13 and coaxial with the axis 18, so that, when threaded in, it thrust the bushing 23 rearwardly. The bushing 23 has its rear face in abutting engagement with the front face of the end-bevelling roll 20, but free of contact with the cylindrical portion of the groove-rolling roll 19. A compression spring 22 is provided between the rolling and bevelling rolls for thrusting the end-bevelling roll 20 toward the bushing 23, so that, upon rotation of the screw handle 21, the end-bevelling roll 20 will be selectively positioned relative to the groove-rolling roll 19.

The method of working a pipe by the use of the inventive tool and the operations thereof will now be explained.

The pipe 24 is held in a vice at a position near its end, while the end portion of the pipe to be worked projects from the vice. The end portion of the pipe is axially inserted into the tool in a manner such that it is surrounded by a pair of receiving rolls and the groove-rolling roll 19. As the handle 16 is turned to thread the screw shaft 15 into the cylindrical nut 14, the rolls are caused to tightly press and support the end portion of the pipe. Thereafter, upon rotation of the grip 11, the pipe 24 has, at a position spaced a predetermined distance from its end, an annular groove 25 cold-rolled with the groove-rolling roll 19. After each rotation of the grip 11, the handle 16 is turned to gradually insert the screw shaft 15 into the cylindrical nut 14. On the other hand, during the rolling, the portion of the end-bevelling roll 20 is maintained without pressing the pipe-end. After several repetitions of the gradual rolling operation, the groove 25 is finished to a desired depth.

Figure 3:
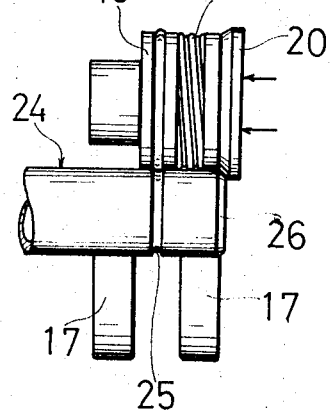
FIG. 3 is a view illustrating a method of working a pipe.
Figure 4:
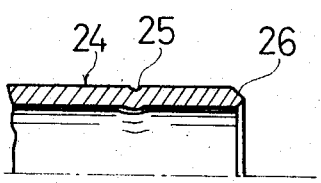
FIG. 4 is a longitudinal cross section of the finished pipe-end.

After the groove 25 has been worked out, the screw handle 21 is turned to thrust the bushing 23 rearwardly so that the end-bevelling roll 20 is shifted to press the end 26 of the pipe 24, as is seen by the arrows in FIG. 3. Then, the grip 11 is rotated several times about the pipe for bevelling the end of the pipe 26. During the bevelling operation the pipe 24 is prevented from any axial movement by the groove-rolling roll 19 which fits in the rolled groove 25. This greatly facilitates bevelling the pipe end 26 with the end-bevelling roll 20. With every rotation of the grip 11, the screw handle 21 is turned gradually to cause the end-bevelling roll 20 to gradually shift against the pipe end 26. After several rotations of the grip 11, the pipe end 26 is bevelled to a smooth mirror-like surface, as is shown in FIG. 4.

Figure 5:
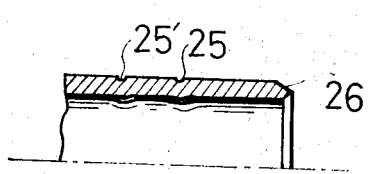
FIG. 5 is a view similar to FIG. 4 showing the pipe-end with double rolled grooves.

In case the pipe is made of a soft material, such as copper, aluminum, or the like, the pipe should have a plurality of annular grooves rolled thereinto prior to the end-bevelling operation. The reason for this is that a single annular groove provides insufficient resistance to its collapse during the end-bevelling operation. Therefore, it is preferable to roll an additional groove 25' at a position more distant than the groove 25 from the pipe end 26, as best seen in FIG. 5.

When the pipe is worked by the use of the tool and the method of the present invention, if 1mm and more in thickness, it will never have its inner diameter contracted by the end-bevelling. This was proved by an example, in which a 15mm outer diameter, 1.5mm thickness pipe was worked to have a rolled groove of in cross-section 1mm diameter semicircle and a bevelled 0.5mm end surface (1mm in diameter) with 30 degree inclination.

The method and the tool of the present invention have many advantages. It is not necessary to carry a machine tool for working the pipe end where the pipe is joined to a joint; bent pipes as well as straight pipes can be worked for coupling with a joint; and it is a simple operation to roll and bevel the end portion of the pipe.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for rolling and bevelling the end portion of a pipe to be coupled with a joint, which comprises the steps of, in turn, confronting the pipe at a position spaced a predetermined distance from the end thereof with an axially restrained groove-rolling roll and at the end thereof with an axially shiftable bevelling roll, pressing said groove-rolling roll against the pipe and rotating said groove-rolling roll relative to said pipe to roll an annular groove on the surface of the pipe, shifting said bevelling roll axially to cause said bevelling roll to be thrust against the end of the pipe, and rotating said bevelling roll relative to said pipe so as to bevel the end of the pipe while said groove-rolling roll is fittingly disposed in said annular groove previously rolled.

2. The method according to claim 1, wherein an additional annular groove is rolled into the surface of the pipe at a location more distant from the end of the pipe than said annular groove.

3. A tool for working the end portion of a pipe comprising a body, an axially restrained groove-rolling roll rotatably mounted on said body, an axially-shiftable bevelling roll rotatably mounted on said body and disposed coaxially with respect to said groove-rolling roll, a pair of receiving rolls rotatably mounted on said body and disposed parallel to said rolling roll, adjusting means mounted on said body for selectively adjusting a space among said rolls, and shifting means mounted on said body for selectively positioning said bevelling roll relative to said groove-rolling roll, whereby, when the pipe is inserted among said rolls, it will be worked to have an annular groove rolled on its surface and an annular surface bevelled at its end.

4. The tool according to claim 3, wherein said body includes a grip for facilitating its rotation, a fixed frame secured to said grip, and a rotatable frame pinned to said fixed frame, said fixed frame carrying said receiving rolls, said rotatable frame supporting said groove-rolling and bevelling rolls, and said adjusting means having first screw means for threadedly connecting said fixed frame to said rotatable frame, whereby, upon adjustment of said first screw means, said rolls will be selectively caused to press and support the pipe disposed therebetween.

5. The tool according to claim 4, wherein said shifting means include resilient means disposed coaxially with and between said groove-rolling and bevelling rolls, bushing means disposed coaxially with and in abutting engagement with said bevelling roll, and second screw means threadedly mounted on said rotatable frame for abutting engagement with said bushing means, whereby, upon adjustment of said second screw means, said bevelling roll will be selectively positioned relative to said groove-rolling roll.

* * * * *